Figure 2:
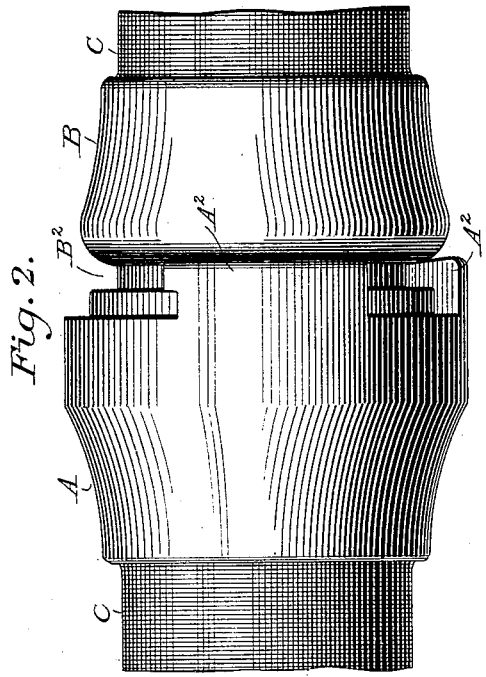

No. 614,888. Patented Nov. 29, 1898.
J. C. POETZ.
HOSE COUPLING.
(Application filed Nov. 29, 1897.)
(No Model.)

Witnesses
Arthur Ashley
J Raymond A. Barnes.

Inventor
John Charles Poetz
by E. M. Marble & Sons
Attorney

UNITED STATES PATENT OFFICE.

JOHN CHARLES POETZ, OF SPOKANE, WASHINGTON, ASSIGNOR OF TWO-THIRDS TO F. LEWIS CLARK, CHARLES SWEENY, HOWELL W. PEEL, AND F. H. MASON, OF SAME PLACE.

HOSE-COUPLING.

SPECIFICATION forming part of Letters Patent No. 614,888, dated November 29, 1898.

Application filed November 29, 1897. Serial No. 660,076. (No model.)

*To all whom it may concern:*

Be it known that I, JOHN CHARLES POETZ, a citizen of the United States, residing at Spokane, in the county of Spokane and State of Washington, have invented certain new and useful Improvements in Hose-Couplings; and I do hereby declare the following to be a full, clear, and exact description of the invention, such as will enable others skilled in the art to which it appertains to make and use the same.

The object of my invention is to provide a coupling for sections of hose and other parts between which a coupling is to be effected which will be simple in construction, instantaneous in its action, and the parts of which will not freeze together in cold weather.

The great majority of hose-couplings heretofore devised have depended for the secure coupling of the joints of the hose upon the making of so tight a connection between the parts of the coupling that water passing through the hose cannot escape. The endeavor has been to prevent escape of water by effecting a water-tight joint at the meeting faces of the fittings of the coupling.

In accomplishing the object of my invention I do not depend for the prevention of the escape of water through the couplings upon the formation of a water-tight joint by the meeting faces of the coupling, but, connecting together the two parts of the hose-coupling firmly and in such a manner that when once put in place the coupling is secure, depend for the prevention of the escape of water upon a flexible gasket on the inner surface of the coupling, which is automatically expanded by the pressure of water passing through the hose and forced so tightly against the meeting faces of the parts of the coupling that escape of water is impossible. As soon as the pressure of water is removed the gasket resumes its normal shape and permits draining of the hose, so that the parts thereof do not freeze together in cold weather and the coupling may be used in cold weather just as effectively as in warm weather. This is a feature of great importance.

The chief merits of my construction are its simplicity of construction, the few parts involved, the certainty of its action, and the feature which, while effectively closing the joining of the two fittings, renders drainage of water from the interior of the hose possible.

A further feature of my invention is a novel lock which I have devised for holding the coupling-fittings together. Owing to the peculiar construction of my lock the parts of the coupling can freely turn with relation to each other without the fittings of the coupling coming apart. The advantages of this construction are multifold; but perhaps nowhere do they appear more prominently than in the automatic untwisting of the hose, which is effected solely by the pressure of the water when the water is first turned on. It is no longer necessary, as in former constructions, for the fireman or other person using the hose to go back along the line of hose and straighten it out before turning on the water, for the hose-couplings revolve upon themselves by reason of the pressure which the water exerts and the hose untwists itself.

My invention is fully illustrated in the drawings which accompany and form a part of this specification, in which the same reference-letters refer to the same or corresponding parts, and in which—

Figure 1:
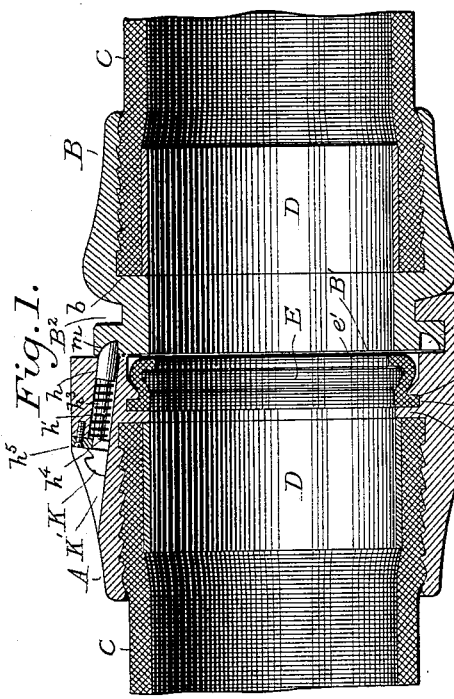
Figure 4:
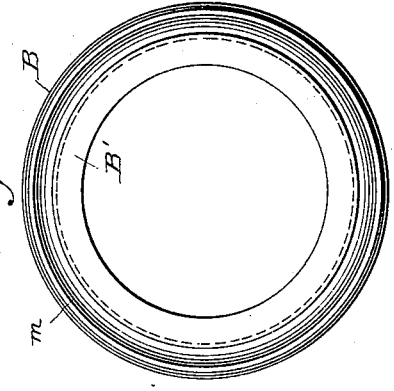
Figure 5:
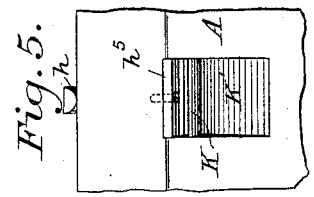
Figure 3:
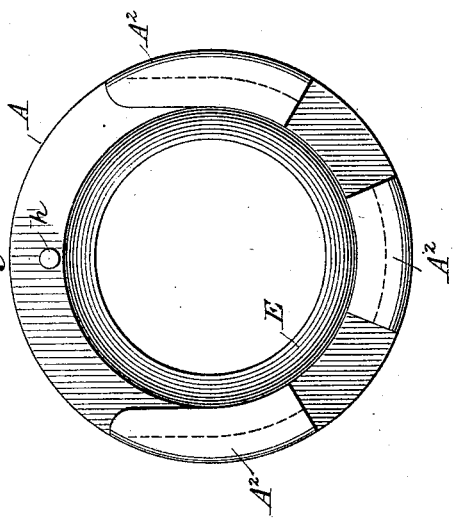

Figure 1 is a sectional view of my coupling. Fig. 2 is an elevation of the same. Fig. 3 is a face view of the male member of the coupling, showing the expanding flexible gasket.

Referring to the drawings, A and B represent, respectively, the female and male fittings of the coupling, and C the lengths of hose held securely within the fittings by the expanding rings D in the ordinary manner. The end of the hose in the male fitting abuts against a shoulder $b$, formed therein. The end of the hose in the female fitting abuts against a ring or flange $a$, projecting inwardly and forming, together with an annular recess $a'$, a seat for the gasket E. The gasket E is made of some flexible material, preferably rubber, and is formed with the base or flange $e$, which fits tightly within the annular recess $a'$, formed in the female fitting. It is also formed with a projecting flexible flange $e'$, which normally extends toward but does not touch the meeting face B' of the male fitting B, but which under pressure of water will be forced upward and effect a water-tight joint with the face of such fitting, effectually preventing escape of water through the coupling. It will be noted that the end of the male fitting is made much thicker than the end of the female fitting and that the flange $e'$ normally extends at an angle to the base or seat of the gasket. This is to allow the expansion of the gasket into place to make a water-tight junction. As soon as the pressure of the water is withdrawn the gasket will automatically resume its normal position and permit draining of the hose-section through the space between the meeting faces of the fittings thereof. Thus freezing together of the parts of the coupling is rendered impossible, and the coupling can be used in cold weather equally as well as in warm weather.

The fittings of the hose-coupling are held securely together by clutches or lugs $A^2$, formed on the female portion of the coupling. These engage with and enter into the annular recess $B^2$, formed on the outer surface of the male fitting. The fittings are locked together when once coupled by the action of the spring-pressed latch $h$, which slides within the guideway cut in the female fitting A and is normally held pressed outward by the spiral spring $h'$. The guideway $h^4$, within which the latch slides, is inclined and is closed on its rear side by the plate $h^5$. The spring $h'$ has its bearing against the plate $h^5$ and encircles the latch-rod $h^3$. The latch-rod $h^3$ extends through the plate $h^5$ and has attached thereto the finger-piece K, by means of which it may be withdrawn. The finger-piece K moves within a recess K', cut in the face of the fitting. The recess gradually slopes upward, so that any ice which may form therein may be removed by means of the finger-piece K, which extends the full width across the recess and prevents water from gaining access to the chamber or guideway holding the spiral spring. The latch $h$ when locking the parts of the coupling together engages in a groove $m$, cut on the outer face of the male fitting B. This latch renders it impossible to accidentally open the joinings of the two fittings no matter to what usage the sections of hose to which the couplings are attached is subjected. The merits of this lock consist in its simplicity and effectiveness and in its being placed so that while readily accessible it will not be likely to be accidentally operated.

While I have described my coupling as used in connection with sections of hose, it may be used to connect together any sections which are to be coupled. It may be used, for instance, to connect the hose to a hydrant or to attach a nozzle to the hose or in any case where two fittings are to be connected together.

While changes in the position or arrangement of the parts may be found necessary to fit the coupling for its use in differing connections, the construction of my coupling in all its essential features will remain unchanged.

Having thus fully described my invention, what I claim as new, and desire to secure by Letters Patent, is—

1. In a hose-coupling, the combination with sections to be coupled, coupling-fittings, and means for locking the same together, of an expansible gasket seated within said fittings normally leaving open the joint between the same, but adapted under pressure of water to expand and make said joint water-tight, substantially as described.

2. In a coupling, the combination with sections to be coupled, coupling-fittings, and means for locking the same together, of a recess on the inner surface of one of said fittings, and an expansible gasket seated within said recess, and having a flange which projects toward the meeting faces of said fittings, whereby said gasket normally leaves open the joint between said fittings, but under pressure of water expands and makes said joint water-tight, substantially as described.

3. In a hose-coupling, the combination with sections to be coupled, coupling-fittings, an annular groove formed in the face of one of said fittings, and a locking device on the other fitting adapted to engage with said groove, of means for preventing side movement of said fittings, substantially as described.

4. In a coupling, the combination with sections to be coupled, of coupling-fittings, one of said fittings being formed with an annular recess, and the other of said fittings being formed with engaging lugs adapted to enter into said recess, of an annular groove formed in the face of one of said fittings, and a locking device on the other fitting adapted to enter into said groove, substantially as described.

5. In a coupling, the combination with sections to be coupled, male and female fittings, and means for holding the parts of the coupling together, of the groove $m$ on the male portion of the fitting, a spring-pressed latch $h$ on the female portion of the fitting, a chamber $h'$ formed therefor, the finger-piece K, and the recess K' formed therefor, substantially as described.

In testimony whereof I affix my signature in presence of two witnesses.

JOHN CHARLES POETZ.

Witnesses:
W. G. FAIRLEIGH,
D. C. DILWORTH.